3,382,280
3',4'-DICHLOROPROPIONANILIDE
Clarence W. Huffman, Glenview, Ill., assignor to Monsanto Company, St. Louis, Mo., a corporation of Delaware
No Drawing. Application May 8, 1961, Ser. No. 108,317, which is a continuation-in-part of abandoned application Ser. No. 661,575, May 27, 1957. Divided and this application Feb. 3, 1967, Ser. No. 613,738
1 Claim. (Cl. 260—562)

ABSTRACT OF THE DISCLOSURE

3',4'-dichloropropionanilide is a new compound which has outstanding herbicidal properties.

Cross-references to related applications

This application is a division of my application Ser. No. 108,317, filed May 8, 1961, which in turn is a continuation-in-part of my application Ser. No. 661,575, filed May 27, 1957, now abandoned.

Background of the invention

Weeds may be broadly defined as undesirable plant growth. In certain places, for example, along railroad tracks, any vegetation thereon is considered a weed and complete eradication of all plants is desired. Of even greater importance is the selective control of weeds in agriculture, i.e., prevention of growth or extermination of weeds without injury to the crops. For example, grass or other plants growing within a corn field are regarded as weeds and they are difficult to remove, since corn is a member of the narrow-leaf family of plants, as are the grasses. Since the physiological structures of the members of the narrow-leaf family are very close, the problem of finding a chemical which has the desired specificity becomes increasingly difficult. Moreover, the selectivity of the chemical must be considered, not only with respect to the soil to which it is applied, but also to the effect of the chemical on adjacent crops which are sensitive to this chemical.

Summary of the invention

This invention relates to a new compound, 3',4'-dichloropropionanilide, of the formula:

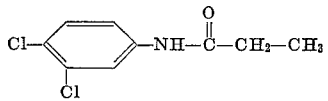

which has unusual and valuable herbicidal activity. This compound can also be named 3,4-dichloropropionanilide or N(3,4-dichlorophenyl)propionamide. For convenience, this compound will be sometimes hereinafter referred to as 3,4-DCPA.

Detailed description

The 3,4-DCPA is, of course, applied in an amount sufficient to exert the desired herbicidal cation. The amount of active compound present in the compositions as actually applied for destroying or preventing weeds, i.e., unwanted plants, will vary with the manner of application, the particular weeds for which the control is sought, the purpose for which the application is being made, and like variables. In general, the herbicidal compositions as applied will contain from about 1% to about 75% by weight of 3,4-DCPA, but can contain 90% by weight or more of 3,4-DCPA.

Valuable herbicidal effects will be observed by applications of small amounts, for example as low as one-half pound of 3,4-DCPA per acre, as well as high concentrations, for example 100 pounds per acre. As a general rule, the selective activity on grasses is exhibited at lower rates of application, from about 0.5 to about 10 pounds per acre. For general application and herbicidal effect on both grasses and dicotyledonous plants, it usually will be found necessary to use amounts in the range of 10 to 50 pounds per acre. Herbicidal compositions are prepared by admixing the 3,4-DCPA in herbicidally effective amounts, with a conditioning agent of the kind used and referred to in the art as a pest control adjuvant or modifier to provide formulations adapted for ready and efficient application to soil or weeds (i.e., unwanted plants) using conventional applicator equipment.

The herbicidal compositions are applied either as a spray or a dust to the locus or area to be protected from undesirable plant growth, commonly called weeds, i.e., plants growing where they are not wanted. Such application can be made directly upon the locus or area during the period of infestation in order to destroy existing undesirable plant growth, and/or application can be made to the locus in advance of an anticipated weed infestation to prevent such. Thus, the composition can be applied as foliar sprays and also as sprays directly to the surface of the soil. Alternatively, the dry powdered compositions can be dusted directly on the plants or dispersed in the surface soil.

Fertilizer materials, other herbicidal and other pest control agents, such as fungicides and insecticides, can be included in the herbicidal compositions if desired.

The following example illustrates a method of preparing 3,4-DCPA:

EXAMPLE A

To a benzene solution containing 161 parts by weight of 3',4'-dichloroaniline and 116 parts by weight of triethylamine, there is added dropwise, through a condenser, 92 parts by weight of propionyl chloride. The reaction mixture is agitated and cooling is employed when necessary to moderate the reaction. The mixture is refluxed until the acyl chloride odor disappears or becomes very faint. Water is then added to dissolve the precipitated triethylamine hydrochloride and the product is collected by filtration. On recrystallization from cyclohexane, there is obtained 172 parts by weight of 3',4'-dichloropropionanilide, M.P. 90.6–91.6.

*Analysis.*—Calculated for $C_9H_9Cl_2NO$: C, 49.6; H, 4.13; Cl, 32.5; N, 6.42. Found: C, 49.6; H, 3.90; Cl, 32.4; N, 6.34.

The present invention is illustrated, but not limited, by the following examples:

Example 1.—Post emergence or foliage tests

Seeds of corn, cotton, ryegrass, beans, morning-glory, and pigweed are planted in soil in boxes having an exposed area of two square feet. After 23 days, the crops are sprayed with an aqueous emulsion of 3,4-DCPA at a rate of 8 pounds per acre. The emulsion is prepared by dissolving 350 mg. of 3,4-DCPA in 4 ml. of methyl isobutyl ketone, adding 12 drops of Agrimul C (an emulsifying agent sold by Napco Chemical Company which comprises a mixture of a polyoxyethylene glycol ester and an alkylaryl sulfonate), and diluting to 40 ml. with distilled water. Application of 10.0 ml. of this emulsion per square foot of soil is equivalent to 8.4 pounds of active ingredient per acre; however, since some drift loss is inevitable when spraying small areas, this rate is assumed to be 8 pounds per acre. Neither the solvent, methyl isobutyl ketone, nor the emulsifying agent, Agrimul C, or a mixture of the two, is toxic to the crops tested.

At the time of spraying, the crops are in approximately the following stages of growth:

Corn—10–12 inches tall
Cotton—2–4 inches tall, 3-leaf stage (including primary leaves)
Ryegrass—3–4 inches tall
Bindweed—2–4 inches tall, 3–5 leaves
Bean—6–10 inches tall, primary leaves mature, second trifoliate leaf about 1 inch in diameter
Pigweed—3–6 inches tall, in bloom due to photoperiod effect.

Throughout the course of the tests, the boxes are watered whenever necessary. Good growth conditions are maintained during the test period (60–75° at night, with daytime temperatures in 75–90° range), and the tests are terminated 21 days after spraying.

possess little or no herbicidal activity. Some of the compounds are set forth below:

3′-chloroisobutyranilide
3′-chloroacetanilide
4′-bromo-2′-phenylacetanilide
2′,4′-dichloropropionanilide
2′,4′-dichloroisobutyranilide
2′,4′,5′-trichloroisobutyranilide
3′,4′-dichlorolauranilide
2′,4′-dimethylpropionanilide
N-methylacetanilide
N-n-butylacetanilide
p-chloroacetylacetanilide
2′,4′-dimethylpropionanilide
2-chloro-2′,4′-dimethylpropionanilide In the following examples, tables of herbicidal evaluation data are presented in which the plants are represented by letters as follows:

| Code | Plant Name | Plant Family | Genus | Species |
|---|---|---|---|---|
| A | Wild Oat | Graminae | Avena | Fatua. |
| B | Brome Grass | do | Bromus | Tectorum. |
| C | Barnyard Grass | do | Echinochloa | Crusgalli. |
| D | Rye Grass | do | Lolium | Perenne. |
| E | Crabgrass | do | Digitaria | Sanguinalis. |
| F | Mustard (Radish) | Crusiferae | Raphanus | Sativus. |
| G | Sugar Beet | Chenopodiacae | Beta | Vulgaris. |
| H | Cotton | Malvaceae | Gossypium | Nerbaceum. |
| I | Pigweed | Amaranthaceae | Amaranthus | Retroflexus. |
| J | Corn | Graminae | Zea | Maize. |
| K | Buckwheat | Polygonaceae | Polygonum | Convolvulus. |
| L | Morning Glory | Convolvulaceae | Ipomoea | Hederacea. |
| M | Foxtail | Graminae | Setaria | Faberii. |
| N | Field Bindweed | Convolvulaceae | Convolvulus | Arvensis. |
| O | Soybean | Leguminosae | Soja | Max. |
| P | Tomata | Solanacae | Lycopersicum | Esculentum. |
| Q | Sorghum | Graminae | Sorghum | Vulgare. |
| R | Rice | do | Oryza | Sativa. |
| S | Flax | Linaceae | Linum | Usitatissimum. |
| T | Alfalfa | Leguminosae | Medicago | Sativa. |
| U | Horsenettle | Solanacae | Solanum | Carolinense. |
| V | Climbing Milkweed | Asclepiadaceae | Ampelamus | Albidus. |
| W | Spurge | Euphorbiaceae | Euphorbia | Sopina. |
| X | Carpetweed | Aizoaceae | Mollugo | Verticillata. |
| Y | Lambsquarter | Chenpodiacae | Chenopodium | Album. |
| Z | Smartweed | Polygonaceae | Polygonum | Pennsylvanicum. |
| (a) | Cheat grass | Graminae | Bromus | Secalinus. |
| (b) | Oats | do | Avena | Sativa. |
| (c) | Wheat | do | Triticum | Vulgare. |
| (d) | Cucumber | Cucurbitaceae | Cucumis | Sativa. |
| (e) | Snap bean | Leguminosae | Phaseolus | Vulgaris. |

When the tests are terminated, the control crops are in approximately the following stages of growth:

Corn—24–36 inches tall
Cotton—8–10 inches tall, 7 leaves
Ryegrass—6–10 inches tall
Bindweed—6 inches tall
Beans—12–18 inches tall, active blooming, many small pods developed
Pigweed—12–16 inches tall, nearly mature The results of such tests are given in Table I, below. Percent stand (% S) is a measure of the number of growing plants in the crops sprayed with 3,4-DCPA as compared to the number of growing plants in the untreated control crops. Percent yield (% Y) is a measure of the weight of plant growth produced with the spray treatment as compared to the weight of crops produced without the spray treatment.

Example 2.—Post emergence greenhouse test 3,4-DCPA is retested at various rates by spraying greenhouse flats (aluminum pans 9½″ x 5¼″ x 2¾″) containing the various plants listed in Table II below with aqueous compositions containing varying concentrations of 3,4-DCPA. At the time of spraying the plants are 21 days old.

Throughout the course of the tests, the flats are watered whenever necessary. Good growth conditions are maintained during the test period. The tests are terminated 14 days after the chemical is applied and the results are observed and recorded.

The relative value of 3,4-DCPA with respect to its herbicidal effect on broadleaf and narrow leaf plants is indicated by number as follows:

0—No phytotoxicity
1—Slight phytotoxicity

TABLE I

| | Corn | | Cotton | | Ryegrass | | Bindweed | | Beans | | Pigweed | |
|---|---|---|---|---|---|---|---|---|---|---|---|---|
| | Percent S | Percent Y | Percent S | Percent Y | Percent S | Percent Y | Percent S | Percent Y | Percent S | Percent Y | Percent S | Percent Y |
| 3′,4′-dichloropropionanilide | 0 | 0 | 0 | 0 | 10 | 5 | 0 | 0 | 0 | 0 | 0 | 0 |

The herbicidal efficiency of 3,4-DCPA is surprising, for related compounds posses little or no herbicidal efficiency. When tested as described above, aqueous emulsions of a random group of such related compounds are found to 2—Moderate phytotoxicity
3—Severe phytotoxicity
4—Dead

TABLE II.—POST EMERGENCE RATING

| Rate, lbs. per acre | A | B | C | D | E | F | G | H | I | J | K | L | M | N | O | P | Q | R |
|---|---|---|---|---|---|---|---|---|---|---|---|---|---|---|---|---|---|---|
| 9.5 | 4 | 4 | 4 | 4 | 4 | 4 | 4 | 4 | 4 | 3 | 4 | 4 | 4 | 4 | 4 | 4 | 4 | 0 |
| 4.0 | 1 | 3 |   | 1 | 4 | 4 | 4 | 4 | 4 | 4 | 4 | 4 | 4 |   | 4 | 4 | 2 | 0 |
| 1.0 | 2 | 2 |   | 0 | 4 | 4 | 4 | 0 | 4 | 1 | 4 | 3 | 4 |   | 4 | 4 | 3 | 0 |

Example 3.—Post emergence field tests

Field test data is obtained on 3,4-DCPA by spraying 13 crops and 11 weed plants at two growth stages (two and four weeks old). The rates of application employed are 2 lbs. per acre and 8 lbs. per acre. This obtained by spraying 30 gallons of the aqueous solution per acre and varying the concentration of the 3,4-DCPA. The following water dispersible powder formulation is utilized in this test:

| | |
|---|---|
| 3,4-DCPA | 50 |
| Sodium dodecyl benzene sulfonate | 5 |
| Sodium citrate dihydrate | 3 |
| Disodium phosphate | 2 |
| Attapulgite | 40 |
| | 100 |

After nine days the 4 week old plants are examined for hebicidal effects and the results recorded. The data on the 2 week old plants is taken 13 days after spraying.

Example 4.—Pre-emergence tests

The value of 3,4-DCPA as a pre-emergence herbicide is determined by planting in greenhouse flats, seeds of eleven different plants, each representing a principal botanical type. The flats are treated with 3,4-DCPA at different rates by varying the concentration of the 3,4-DCPA in the composition applied to the soil.

The tests are terminated fourteen days after application and the results are observed and recorded.

The value of 3,4-DCPA with respect to its herbicidal effect on the various plants is indicated by a number as follows:

0—No phytotoxicity
1—Slight phytotoxicity
2—Moderate phytotoxicity
3—Severe phytotoxicity The following table of observed data demonstrates the selective phytotoxicity of 3,4-DCPA:

TABLE IV

| Rate, lbs/acre | A | B | C | D | E | F | G | H | I | J | K | L | M | N | O | P | Q | R |
|---|---|---|---|---|---|---|---|---|---|---|---|---|---|---|---|---|---|---|
| 10 | 1 | 3 | 3 | 1 | 3 | 3 | 3 | 0 | 3 | 0 | 3 | 0 | 3 | 0 | 0 | 1 | | |
| 4 | 0 | 1 | 0 | 0 | 0 | 2 | 0 | 1 | 3 | 0 | 0 | 0 | 0 | 0 | | | | |
| 3 | 0 | 0 | 3 | 0 | 3 | 0 | 0 |   | 3 |   | 0 | 0 | 3 | 0 | 0 | 0 | 0 | 0 |

The contact rating code for the field tests is as follows:

6—Complete kill
5—Extreme injury
4—Severe injury
3—Moderate injury
2—Slight injury
1—Very slight injury
0—No injury

TABLE III.—POST EMERGENCE FIELD TEST DATA

| Code designation | 2 week plants | | 4 week plants | |
|---|---|---|---|---|
| | 8 lbs./acre | 2 lbs./acre | 8 lbs./acre | 2 lbs./acre |
| Crops: | | | | |
| G | 6 | 6 | 6 | 3 |
| H | 6 | 6 | 6 | 2 |
| J | 6 | 3 | 4 | 3 |
| K | 6 | 6 | 5 | 4 |
| O | 6 | 5 | 6 | 4 |
| P | 6 | 6 | 2 | 1 |
| Q | 6 | 4 | 4 | 3 |
| S | 6 | 5 | 5 | 1 |
| T | 6 | 6 | 4 | 3 |
| (e) | | | 6 | |
| (b) | 5 | 1 | 4 | 2 |
| (c) | 6 | 4 | 5 | 2 |
| (d) | 6 | 6 | 6 | 5 |
| Weeds: | | | | |
| (a) | 6 | 4 | 5 | 1 |
| E | 6 | 6 | 6 | 2 |
| I | 6 | 6 | 6 | 4 |
| L | 6 | 4 | | 2 |
| M | 6 | 6 | 6 | 3 |
| U | | | 2 | 0 |
| V | | | 2 | 2 |
| W | 6 | | 6 | |
| X | 6 | 6 | 4 | 2 |
| Y | | | 6 | |
| Z | | | 4 | 4 |

General herbicidal effects are obtained when 3′, 4′-dichloropionanilide is retested at 25 pounds per acre.

What is claimed is:
1. 3′,4′-dichloropropionanilide.

References Cited

FOREIGN PATENTS 1,005,784   9/1957   Germany.

OTHER REFERENCES

Beilstein's, Handbuch der Organischen Chemie, 4th ed. vol. 12, pp. 622 and 626. Berlin, Springer, 1929.

King Chemicals Evaluated As Insecticides And Repellents At Orlando, Fla. U.S. Department of Agriculture Handbook No. 69, pg. 285, Wash., D.C., U.S. Government Printing Office, 1954.

NATALIE TROUSOF, *Primary Examiner.*